United States Patent

Rhoades

[15] 3,704,641

[45] Dec. 5, 1972

[54] AUTOMATIC TOOL SETTING SENSOR

[72] Inventor: John M. Rhoades, Waynesboro, Va.

[73] Assignee: General Electric Company

[22] Filed: May 27, 1971

[21] Appl. No.: 147,679

Related U.S. Application Data

[63] Continuation-in-part of Ser. No. 802,973, Feb. 27, 1969, abandoned.

[52] U.S. Cl.....................82/14 R, 82/2 B, 82/14 D, 235/151.11, 318/572
[51] Int. Cl. .............................................B23b 3/28
[58] Field of Search...........82/14 R, 14 D, 21, 1, 2 B; 318/572; 235/151.11

[56] References Cited

UNITED STATES PATENTS

| | | |
|---|---|---|
| 3,209,221 | 9/1965 | Pugsley et al.....................318/572 X |
| 3,350,966 | 11/1967 | Moulton................................82/21 |
| 3,400,313 | 9/1968 | Bullard et al........................318/572 |
| 3,447,419 | 6/1969 | Foster..............................318/572 X |

*Primary Examiner*—Leonidas Vlachos
*Attorney*—William S. Wolfe, Frank L. Neuhauser, Oscar B. Waddell and Joseph B. Forman

[57] ABSTRACT

A numerical control system for a machine tool including an electromechanical transducer for producing compensating signals proportional to errors in the setting of a cutting tool in its toolholder relative to a programmed setting. The numerical control is programmed to drive the toolholder to a predetermined position in which the tip of the cutting tool engages a deflectable stylus of the transducer. The stylus is mechanically locked in its deflected position by an electromagnetic brake. Sensing coils within the transducer provide continuous signals indicative of the deflected position of the stylus and thus of any errors in the setting of the cutting tool. This information is used to continually modify input data to compensate for those errors.

7 Claims, 4 Drawing Figures

INVENTOR.
JOHN M. RHOADES
BY Michael Masnik
HIS ATTORNEY

AUTOMATIC TOOL SETTING SENSOR

This application is a continuation in part of application, Ser. No. 802,973 filed Feb. 27, 1969, now abandoned.

BACKGROUND OF THE INVENTION

The present invention relates to control systems for automatic machine tools. More specifically, the present invention relates to a system for continuous compensation of errors in the setting of a cutting tool associated with an automatic machine tool.

Automatically controlled machine tools are now in common use throughout the metalworking industry. The control system which commands and monitors the various machine functions has come to be referred to generically as a numerical control. While numerical control systems perform a variety of functions (tool selection, control of coolant, etc.), the primary function is the control of the motion of the cutting tool so as to generate workpieces with the proper dimensions. Control of the dimensional accuracy of the workpieces is generally accomplished by monitoring some portion of the machine with a feedback device which indicates the position of the monitored machine member.

In a lathe, for example, the cutting tool is capable of moving in two perpendicular axes, the first being parallel to the workpiece and the second being perpendicular to the workpiece. The cutting tool is generally driven along the two axes by two separate motors (electric or hydraulic) coupled to the toolholder through lead screws, rack and pinion drives, etc. Feedback devices attached to the drives reflect the position of the cutting tool relative to the workpiece on each controlled axis. The feedback device may be attached either to the drive motor or to the controlled machine member as, for example, by way of an instrument rack mounted on the machine member.

While feedback devices have varying degrees of sophistication and accuracy, they all have one distinct limitation in that they monitor the position of the machine member and not the position of the cutting edge of the cutting tool. Thus, the accuracy to which a workpiece is machined is directly affected by any deviation between the actual position and the programmed position of the edge of the cutting tool. As the cutting tool wears or is replaced, the deviation varies.

Heretofore, it has been the responsibility of the individual operating the machine tool to compensate for errors in the setting of the cutting tool. In some systems, this requires accurate mounting of the cutting tool, a procedure which is extremely time consuming and less than fully satisfactory. In more advanced systems, the machine tool operator must measure the cutting tool, either before or after it is placed in the toolholder and program the measurement data into the control system. The control system calculates the necessary compensation and modifies the input dimensional data so as to account for the dimensional errors in the cutting tool. While this procedure has worked fairly well, it requires that the operator make time-consuming measurements occasionally during cutting operations and each time the cutting tool is changed or replaced.

SUMMARY OF THE INVENTION

The disadvantages of the prior art techniques and apparatus are overcome by the present invention. The invention is part of a control system for a machine tool. The system includes a position transducer having a deflectable stylus which engages the edge of a cutting tool and a sensing means for indicating the deflected position of the stylus. The invention further includes means for mechanically locking the stylus in its deflected position. Data representing desired motion of the machine tool along the axes is provided to motion command circuits through data input means. The input data is modified by the output of the sensing means in the position transducer to compensate for errors in the location of the edge of the cutting tool.

DESCRIPTION OF THE DRAWINGS

While the specification concludes with claims particularly pointing out and distinctly claiming the subject matter which is regarded as the invention, an illustration of a particular embodiment can be seen by referring to the specification in connection with the accompanying drawings in which:

DETAILED DESCRIPTION

Figure 1:
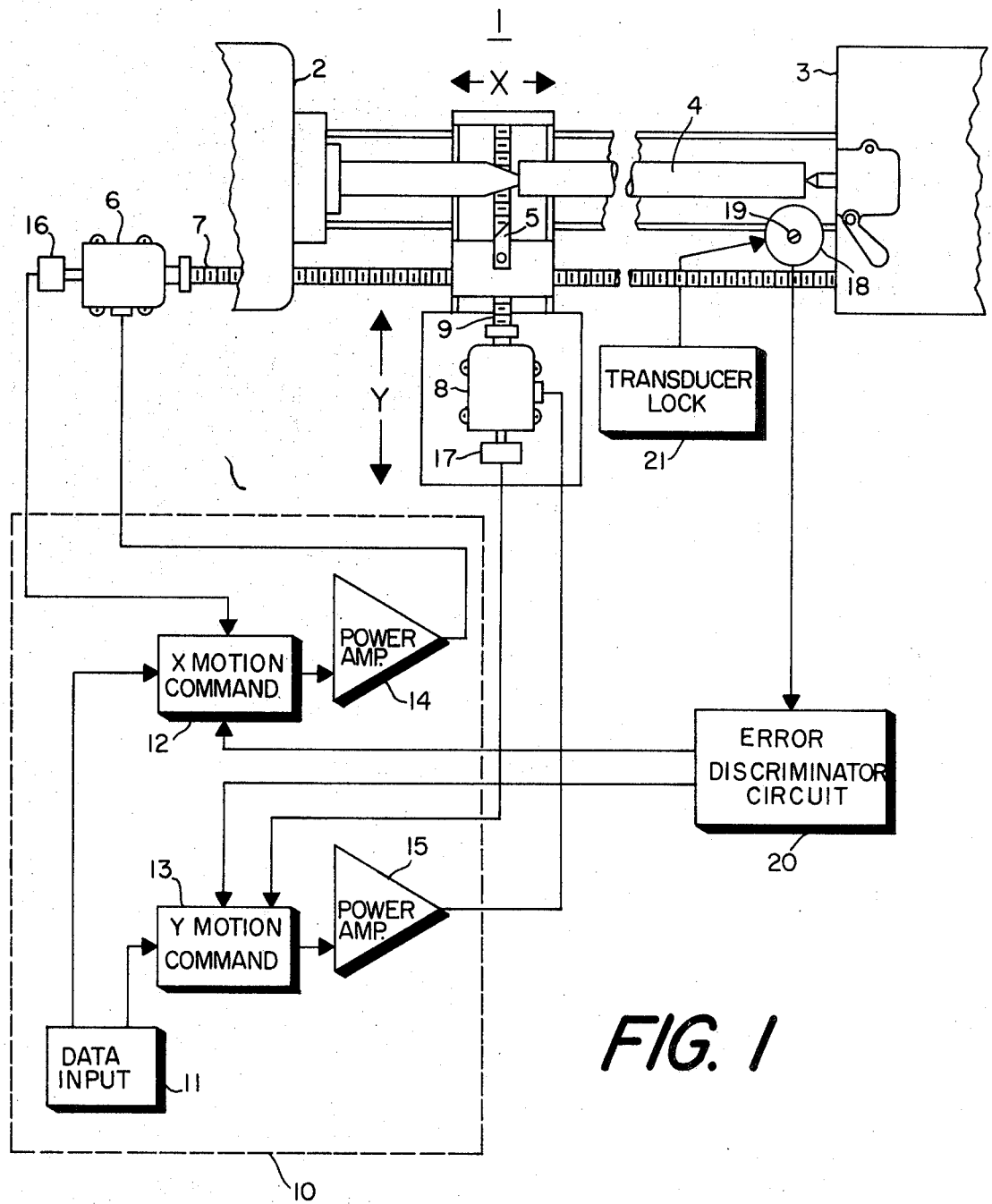
FIG. 1 is a block diagram of the control system which constitutes a preferred embodiment of the present invention.

Turning now to FIG. 1, there is shown in block diagram form a preferred embodiment of a control system for compensating for errors in the setting or location of the edge of a cutting tool. By way of illustration, the control system will be described with respect to its operation of a cutting tool on a lathe. It should be clear, however, that the present invention is not limited to control systems for use with lathes. The principles of the present invention apply to compensation on many types of automatically controlled machine tools.

In FIG. 1, there is shown a lathe 1 consisting of a headstock 2 and a tailstock 3 which has a workpiece 4 mounted therebetween. A cutting tool 5 may be moved parallel to the workpiece along an X-axis and perpendicular to the workpiece 4 on a Y-axis.

To provide motion in the X-axis, a driving means such as DC motor 6 can be energized to rotate a lead screw 7 which moves the cutting tool 5 along the X-axis. Similarly, a second driving means such as DC motor 8 is coupled to a lead screw 9 to move the cutting tool 5 toward or away from the workpiece along the Y-axis. By appropriately controlling the rotation of the DC motors 6 and 8, cutting tool 5 can be made to follow any desired path so as to machine a workpiece to a desired contour. Control of the rotation of these motors so as to follow this desired path is one of the functions of a numerical control system, a portion of which is shown generally at 10.

While numerical control systems perform a variety of functions in controlling a machine tool, it is necessary for the present invention only to show the limited portion indicated generally at 10 in FIG. 1. The portion shown constitutes a block diagram of the parts of a numerical control system which are conventionally used in order to control the motion of a toolholder along two mutually perpendicular axes of a machine tool such as the lathe 1 of FIG. 1. The information as to the desired motion of the toolholder along these two axes is relayed by some type of data input 11. Data input 11 may comprise, for example, a punched paper tape reader which conveys the desired information from a preprogrammed punched paper tape. Alternatively, data input 11 might comprise a series of thumbwheel switches which the individual operating the machine tool can select in order to call for machine motion as desired.

The information from data input 11 is fed to two motion command circuits 12 and 13. Each of the circuits 12 and 13 also receives a feedback signal representing the present position of the toolholder on one of the machine axes. The feedback signals are generated by position feedback devices 16 and 17 connected to DC motors 6 and 8, respectively. The feedback devices 16 and 17 may be selsyns which are coupled to the drive motors directly. The output of the feedback device 16 forms the second input to motion command circuit 12 while the output of feedback device 17 forms the second input to motion command circuit 13.

The numerical control system described above is conventional and does not include apparatus for compensating for errors in the location of the edge of cutting tool 5 relative to a programmed location. Obviously, if cutting tool 5 is too long or is placed in its toolholder to the right or left of its desired setting, this information is in no way reflected by the feedback from feedback devices 16 and 17.

Errors between the desired and the actual location of the edge of cutting tool 5 are compensated for by apparatus including a position transducer 18. As shown in FIG. 1, position transducer 18 is mounted at a predetermined location on the lathe 1. This position may be referred to as the "zero position." To measure the error in the setting of cutting tool 5, the cutting tool 5 is driven to the "zero position" at which point the edge of the cutting tool 5 deflects a moveable stylus 19 of position transducer 18.

Internally, the position transducer 18 includes means for sensing the position of the deflected stylus to establish signals proportional to the difference between the actual and the desired location of the edge of cutting tool 5.

Once the edge of cutting tool 5 deflects stylus 19, the stylus 19 is mechanically locked at its deflected position by means of a signal from transducer lock circuitry 21. With the stylus locked in the deflected position, edge location error signals remain available even after cutting tool 5 is removed. The output of transducer 19 is transmitted to error discriminator circuitry 20 whose outputs are fed to the X motion command and Y motion command circuits 12 and 13. In one embodiment of the invention, circuitry 20 produces two D.C. signals. One signal represents the error in tool edge location on the X-axis whereas the other signal represents the error in tool edge location on the Y-axis. These signals can be used to modify each block of input data so as to compensate for the errors in the setting of the cutting tool. Thus, if the cutting tool is 0.002 inch too long in the Y-axis direction, it will only be necessary to subtract 0.002 inch from each block of data in the Y-axis. Similarly, if the cutting tool is positioned in the toolholder 0.005 inch too far to the right, it is only necessary to subtract this dimension from each block of the input data for X-axis if the tool is to be moved from left to right relative to the workpiece.

Figure 2:
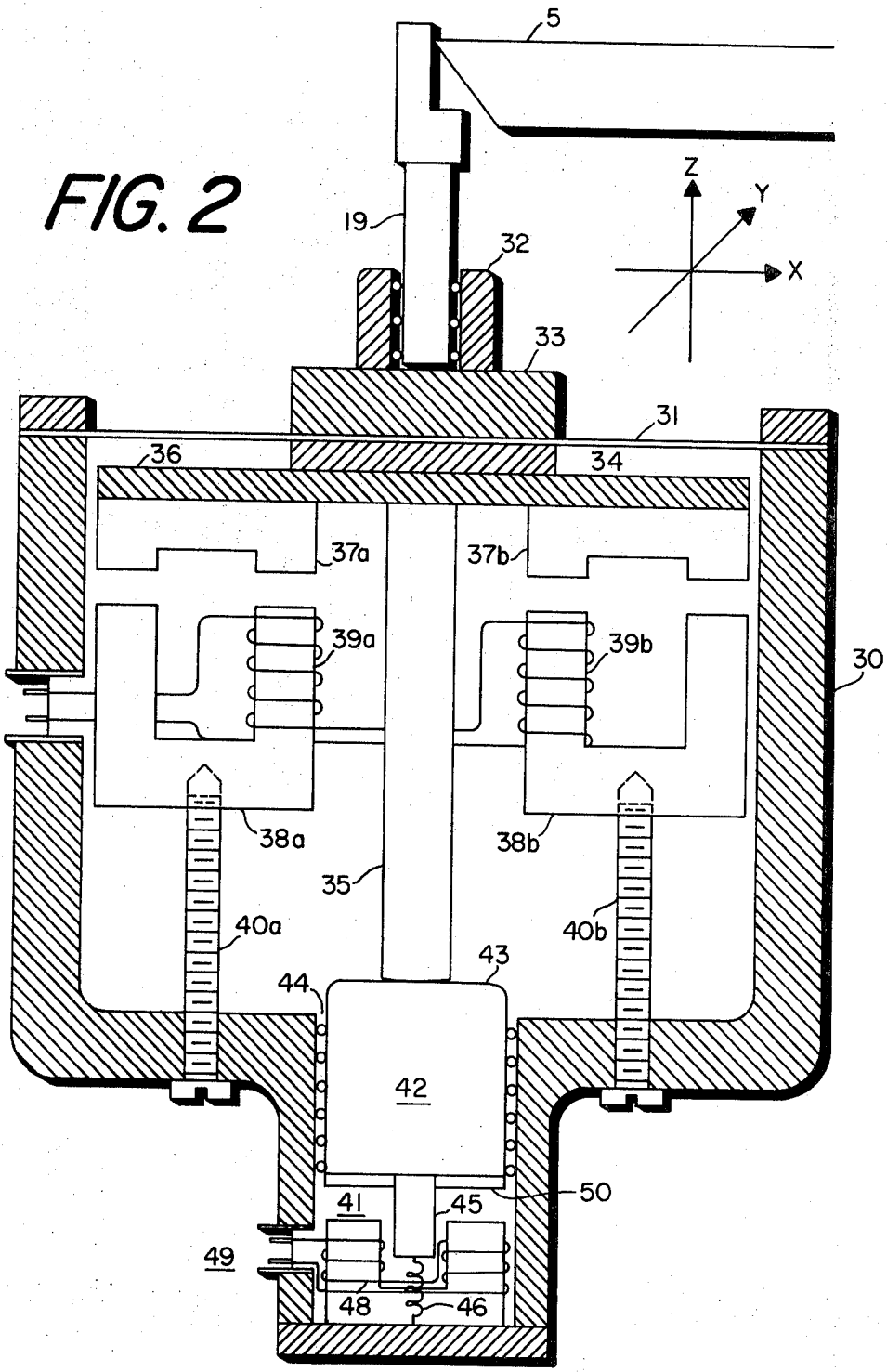
FIG. 2 is a cross-sectional view taken along line A—A in FIG. 3 showing a preferred embodiment of the electromechanical transducer of FIG. 1.

Turning now to FIG. 2, there is shown a cross-sectional view of a preferred embodiment of the electromechanical position transducer 18 of FIG. 1. Transducer 18 consists of a casing 30 having an opening formed in the top thereto. A flexible member, such as metallic diaphragm 31, is disposed within the opening in casing 30 so as to provide a pivot point for stylus 19. Stylus 19 is mounted in a stylus mount which consists of a bearing 32 which is connected to a circular plate 33 attached to diaphragm 31.

Stylus 19 is constructed so that the surface of the stylus which engages cutting tool 5 is substantially flat. When cutting tool 5 comes into contact with this flat surface, stylus 19 will rotate in bearing 32 until the tip of cutting tool 5 is substantially tangent with this flat surface. An extension of the stylus mount is connected to the diaphragm 31 so as to extend into the casing 30. This extension consists of a circular plate 34 and an extension rod 35. Extension rod 35 extends perpendicularly into the opening defined by casing 30. In addition, there is provided a second circular plate 36 which has electromagnetic pole pieces 37a and 37b attached thereto. As will be seen in the description of FIG. 3, there are actually four such pole pieces provided in the instant embodiment, only two of which are revealed by the cross-sectional view of FIG. 2.

Mounted below the pole pieces 37a and 37b are two magnetic cores 38a, 38b having windings 39a, 39b, respectively. For the purposes of the present description, it suffices to say that cores 38a and 38b in conjunction with their windings 39a and 39b act to sense the position of the pole pieces 37a and 37b which are connected to the extension of the stylus mount. This is accomplished by virtue of the fact that displacement of stylus 19 causes circular plate 36 to be displaced, thereby changing the air gaps between cores 38a, 38b and their associated pole pieces. Hence, by appropriate excitation of the windings 39a, 39b, it is possible to determine the position of stylus 19 which is, of course, indicative of the error between the actual location and the assumed location of the edge of the cutting tool 5.

Cores 38a and 38b are held in position by mounting screws 40a and 40b which, in addition to holding the cores in position, can also be used to adjust the relative position of the cores with respect to their pole pieces so as to provide for mechanical adjustment of the transducer.

The structure of electromechanical transducer 18 as defined thus far, with the exception of extension rod 35, is old in the art as shown, for example, in U.S. Pat. No. 2,492,731. This well-known structure has been used for some time, primarily in electromechanical transducers which are associated with so-called tracer control systems which operate a machine tool in response to a pattern provided by a template. Briefly stated, the operation of an electromechanical transducer of this type is such that the deflection of the stylus will be resolved by a plurality of sensing coils mounted within casing 30. This signal is fed to appropriate electrical circuitry such as that shown in FIG. 4 to derive two discrete signals indicative of the displacement of stylus 19 in the two mutually perpendicular axes X and Y indicated in FIG. 2.

In addition to the stylus and its associated mounting and sensing apparatus, there is provided locking means for mechanically engaging and holding the deflected stylus 19 of the transducer in a particular position. In the preferred embodiment shown, locking is accomplished by an electromagnetic brake 41. The electromagnetic brake 41 includes a brake plate 42 having a substantially flat face 43 adjacent the spherical lower end of extension rod 35. The brake shoe 42 is mounted within a linear bushing 44 and is spring biased away from the bottom of casing 30 by an extension 45 and a spring 46. Spring 46 normally forces the flat face 43 of brake plate 42 upwardly into engagement with the lower end of extension rod 35. Friction between the face 43 and the end of rod 35 holds stylus 19 in the position occupied at the time of contact between face 43 and rod 35.

In addition to brake plate 42, there is also provided an electromagnetic core 47 having a winding 48 connected to terminals 49 through which external power can be supplied. A magnetic armature 50 mounted on the bottom of brake plate 42 is attracted toward core 47 upon energization of the winding 48 to pull the brake plate 42 downwardly out of engagement with the extension rod 35, thereby releasing the stylus 19 and its associated hardware.

Briefly stated, operation of the electromechanical transducer of FIG. 2 is as follows. Power is applied at terminal 49 to energize the winding 48 on core 47, thereby pulling the brake plate 42 downwardly out of the engagement with extension rod 35. The cutting tool 5 is then moved into engagement with stylus 19 to deflect the stylus and its associated hardware in accordance with the physical dimensions of cutting tool 5. At this point, it is possible to detect the position of stylus 19 by way of the sensing coils located within the casing. However it is clear that this detection cannot be accomplished after the cutting tool 5 is withdrawn since stylus 19 will once again return to its normal, undeflected position. However, if the electrical power supplied at terminal 49 is removed, then the flat face 43 of brake plate 42 is biased upwardly by spring 46 into frictional engagement with the lower end of rod 35. Thus, the transducer 18 will be locked in its deflected position, even after cutting tool 5 is withdrawn. In this way, the detected error between the actual and the assumed location of the edge of cutting tool 5 is retained in transducer 18. The sensing coils of transducer 18 continually provide a reliable indication of edge location errors.

It should be pointed out that the location of electromagnetic brake 41 and its relationship with the extension rod 35 comrpise only a preferred embodiment of a means for blocking and mechanically engaging the extension of stylus 19. It might also be possible, for example, to provide some type of electrically energizable brake mounted in the side walls of casing 30 which would operate horizontally within the casing and engage some other portion of the extension of the stylus mount such as, for example, the plate 36 of FIG. 2. Broadly stated, the present invention contemplates means for mechanically engaging and holding the stylus in its deflected position and should not be limited to the particular brake structure or physical arrangement shown in FIG. 2.

Figure 3:
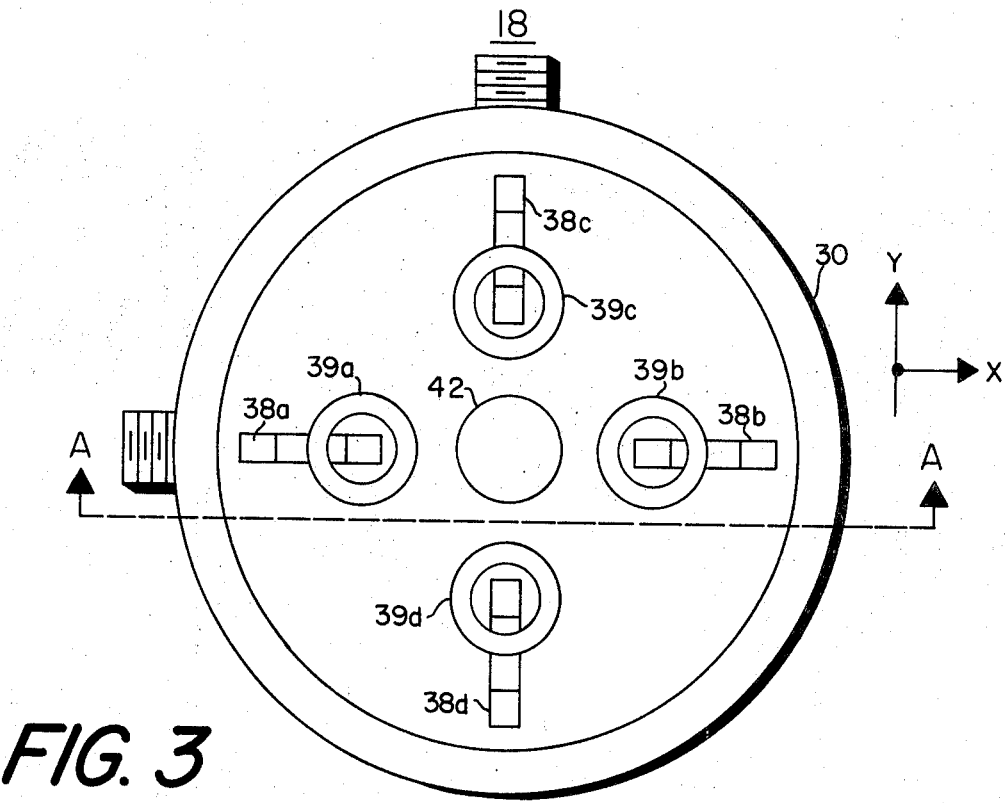
FIG. 3 is a top view of the electromechanical transducer of FIG. 2 with certain elements removed to better show the relationship of the sensing coils.

Turning now to FIG. 3, there is shown a top view of the electromechanical transducer 18 with the stylus, stylus mount, flexible diaphragm and stylus mount extension removed. This view illustrates the location of the sensing coils in the preferred embodiment of FIG. 2. The embodiment uses four such sensing coils in order to resolve the deflection of the stylus 19 into two mutually perpendicular axes. As can be seen, the magnetic cores 38a, 38b, 38c and 38d are disposed within the casing 30 in pairs mounted on opposite sides of the casing, the pairs being perpendicularly disposed with respect to one another. Thus, magnetic core 38a and its associated winding 39a form a first pair with magnetic core 38b and its associated winding 39b. This first pair acts to create a signal related to the position of their associated pole pieces which indicates the displacement of the stylus in the first of two mutually perpendicular axes. Similarly, magnetic core 38c and its associated winding 39c forms a pair with magnetic core 38d and its associated winding 39d, this second pair being arranged perpendicularly with respect to the first. The function of the second pair is to indicate the displacement of the stylus in a second axis which is perpendicular with the axis sensed by the first pair. Finally, for the purposes of illustration, brake plate 42 is shown arranged substantially centrally with respect to the four magnetic cores within casing 30 so as to interact with extension rod 35 when the remainder of the sensor is placed in the position shown in FIG. 2.

Figure 4:
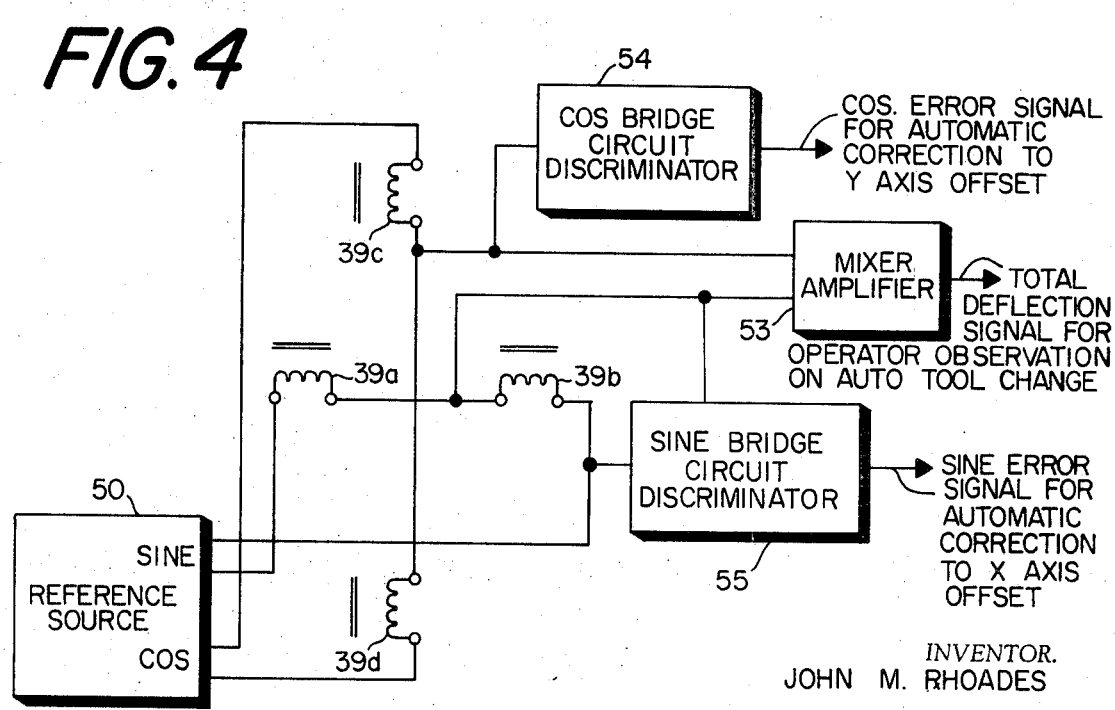
FIG. 4 is a circuit diagram illustrating the operation of the electromechanical transducer of FIGS. 2 and 3.

Turning now to FIG. 4, there is shown an electrical block diagram indicating one way of activating the sensing coils of the preferred embodiment of FIGS. 2 and 3. A reference voltage source 50 generates two alternating current signals which have a standard frequency such as 400 cycles per second. The two AC outputs, labeled SIN and COS are identical in magnitude and frequency, but are phase displaced 90° with respect to each other.

The reference voltage from the SIN output is fed to the first pair of coils, 39a and 39b, whereas the output from the COS terminal is fed to the second pair, 39c and 39d. As was pointed out above, the effect of displacing the stylus is to change the air gap of the sensing coils by moving their associated pole pieces closer to or farther away from the cores, changing the air gap results in a change in the impedance of the coils. The output from each pair is fed into discriminator circuits 54 and 55. Since deflection of the stylus unbalances the air gaps associated with these coils, the output of each pair is a signal which is representative of the components of the deflection affecting this particular pair. The output of the two bridge circuits 51 and 52 are added together by mixer 53. The output of mixer 53 is the result of adding the output of bridge circuits 51 and 52 and the resulting output signal has a phase angle which represents the direction of stylus deflection and a magnitude which represents the magnitude of the stylus deflection. This signal is then fed to an appropriate circuit which indicates the vector deflection and can be used to activate limit detecting circuits. In one embodiment of the invention, discriminator 54 and 55 output voltages are scaled and summed with other input voltages at the input of position loop operational amplifiers in X and Y motion command circuits 12 and 13.

While the present embodiment discloses a position transducer which has sensing coils with variable air gaps, it will be obvious to those skilled in the art that the deflection of the stylus can be monitored by a variety of sensing circuits. Thus, although the invention has been described with respect to a particular embodiment, the principles underlining this invention will suggest many additional modifications of the particular embodiment shown to those skilled in the art. Therefore, it is intended that the appended claims shall not be limited to the specific embodiments described, but rather shall cover all such modifications as fall within the true spirit and scope of the invention.

I claim:

1. A control system for compensating for the dimensional errors of a cutting tool on an automatically controlled machine tool comprising:
    a. a position transducer including a deflectable stylus for engaging the edge of the cutting tool and sensing means for indicating the deflected position of said stylus;
    b. locking means for mechanically locking the position of said deflected stylus after deflection by the cutting tool;
    c. data input means for providing dimensional input data indicative of the desired motion of the axes of the controlled machine tool; and
    d. motion command circuits operatively connected to said data input means for storing the dimensional input data, said circuits being operatively connected to said sensing means whereby the input data is modified by the output of said sensing means so as to compensate for errors in the location of the edge of said cutting tool.

2. The compensating control system as recited in claim 1 wherein said locking means comprises an electromagnetic brake.

3. The compensating control system as recited in claim 2 wherein said sensing means comprises a plurality of coils whose air gap changes as said stylus is deflected.

4. A control system according to claim 1 wherein said position transducer comprises:
    a. a casing having an opening form in the top thereof;
    b. a flexible member mounted across said opening in the top of said casing;
    c. a deflectable stylus;
    d. a stylus mount for mounting said stylus slightly off center of said flexible member to facilitate proper alignment;
    e. a stylus bearing to permit stylus to deflect its planes of contact which are tangent to the edge of the cutter surface;
    f. an extension of said stylus mount projecting below said flexible member into said casing;
    g. sensing means arranged within said casing to electromagnetically sense the position of said extension; and
    h. locking means for mechanically engaging and holding said extension.

5. The electromechanical position transducer as recited in claim 4 wherein said locking means comprises an electromagnetic brake.

6. The electromechanical position transducer as recited in claim 5 wherein said extension of said stylus mount includes an extension rod projecting substantially vertically downward into said casing.

7. The electromechanical position transducer as recited in claim 6 wherein said electromagnetic brake includes a brake plate which is vertically upwardly spring biased whereby de-energization of said electromagnetic brake results in forcing said brake plate into contact with the lower end of said extension rod.

* * * * *